United States Patent
Smith et al.

(10) Patent No.: US 12,358,369 B2
(45) Date of Patent: Jul. 15, 2025

(54) VEHICLE HUMAN MACHINE INTERFACE GENERATING SYSTEM AND METHOD FOR GENERATING THE SAME

(71) Applicant: Honda Motor Co., Ltd., Tokyo (JP)

(72) Inventors: Joan Smith, Plain City, OH (US); Matt Komich, Denver, CO (US)

(73) Assignee: Honda Motor Co., Ltd., Tokyo (JP)

( * ) Notice: Subject to any disclaimer, the term of this patent is extended or adjusted under 35 U.S.C. 154(b) by 305 days.

(21) Appl. No.: 17/871,747

(22) Filed: Jul. 22, 2022

(65) Prior Publication Data

US 2024/0025251 A1    Jan. 25, 2024

(51) Int. Cl.
| | |
|---|---|
| *B60K 35/00* | (2024.01) |
| *B60K 35/10* | (2024.01) |
| *B60K 35/65* | (2024.01) |
| *B60W 40/08* | (2012.01) |
| *B60W 50/00* | (2006.01) |
| *G06N 20/00* | (2019.01) |

(52) U.S. Cl.
CPC ............. *B60K 35/00* (2013.01); *B60W 40/08* (2013.01); *B60W 50/0098* (2013.01); *G06N 20/00* (2019.01); *B60K 35/10* (2024.01); *B60K 35/65* (2024.01); *B60K 2360/11* (2024.01); *B60K 2360/741* (2024.01); *B60W 2050/0022* (2013.01); *B60W 2050/0083* (2013.01); *B60W 2540/043* (2020.02); *B60W 2540/223* (2020.02); *B60W 2556/10* (2020.02)

(58) Field of Classification Search
CPC ....... B60R 35/00; G06N 20/00; B60W 40/08; B60W 50/0098
See application file for complete search history.

(56) References Cited

U.S. PATENT DOCUMENTS

| | | | |
|---|---|---|---|
| 6,668,221 B2 | 12/2003 | Harter, Jr. et al. | |
| 7,605,773 B2 | 10/2009 | Janssen | |
| 8,947,217 B2 | 2/2015 | Moussa et al. | |
| 9,919,621 B2 | 3/2018 | Lippman et al. | |
| 10,162,175 B2 | 12/2018 | Hardy et al. | |
| 11,042,249 B2 | 6/2021 | Perdices-Gonzalez et al. | |
| 2009/0295835 A1 | 12/2009 | Husoy | |
| 2017/0045890 A1* | 2/2017 | Gurin | G06Q 50/40 |
| 2017/0249718 A1* | 8/2017 | Wunderlich | G06F 3/0488 |
| 2019/0335164 A1 | 10/2019 | Engelen et al. | |
| 2020/0039433 A1 | 2/2020 | Singh | |
| 2020/0216077 A1* | 7/2020 | Nölscher | H04L 67/306 |
| 2021/0064393 A1* | 3/2021 | Pipe | G06N 20/00 |
| 2021/0316754 A1* | 10/2021 | Bielby | B60W 10/20 |
| 2023/0174007 A1* | 6/2023 | Ostrowski | B60N 2/0273 |
| 2024/0025363 A1* | 1/2024 | Nakamura | B60N 2/002 |

FOREIGN PATENT DOCUMENTS

| | | |
|---|---|---|
| GB | 2405546 | 3/2005 |
| WO | 2018100377 | 6/2018 |

* cited by examiner

*Primary Examiner* — Peter D Nolan
*Assistant Examiner* — Mikko Okechukwu Obioha
(74) *Attorney, Agent, or Firm* — JCIP GLOBAL INC.

(57) ABSTRACT

A method for generating a vehicle human machine interface is disclosed. The identities of each of a plurality of occupants in a vehicle are determined. A plurality of interface settings corresponding to the plurality of occupants are obtained according to the identities. A machine learning operation is performed according to the identities of the plurality of occupants and the plurality of interface settings. The vehicle human machine interface is generated according to a result of the machine learning operation.

21 Claims, 9 Drawing Sheets

VEHICLE HUMAN MACHINE INTERFACE GENERATING SYSTEM AND METHOD FOR GENERATING THE SAME

BACKGROUND

The present disclosure relates to a vehicle human machine interface (HMI) generating system and a method for generating a vehicle HMI.

An HMI is a medium of interaction and information exchange between a system and its users. In the vehicle industry, the HMI may realize the conversion between the internal information of the vehicle and a form acceptable to human beings. The HMI may be a software application or a user interface designed to interact between the user and the vehicle, for example.

In some environments, the occupants, including the driver and the passengers, may make manual adjustments to customize the HMI environment to align with their preferences. The present disclosure provides an improved vehicle HMI generating system and a method for generating a vehicle HMI.

SUMMARY

According to one aspect of the present disclosure, a method for generating a vehicle human machine interface (HMI) is disclosed. The method may include determining the identities of each of a plurality of occupants in a vehicle. In addition, the method may include obtaining a plurality of interface settings corresponding to the plurality of occupants according to the identities. The method may also include meshing the identities of the plurality of occupants and the plurality of interface settings. The method may include generating the vehicle HMI according to the meshing.

According to another aspect of the present disclosure, a vehicle HMI generating system is disclosed. The system may include a database, an occupation determination device, a biometric identification device, and a computation device. The database may store a plurality of interface settings corresponding to a plurality of occupants. The occupation determination device may be used to determine an occupation status in a vehicle. The biometric identification device may be used to determine an identity information corresponding to more than one occupant in the vehicle based on the occupation status. The computation device may perform a machine learning operation to generate a vehicle HMI based on the plurality of interface settings corresponding to the more than one occupants and the occupation status corresponding to the more than one occupants.

According to still another aspect of the present disclosure, a non-transitory computer-readable medium having instructions stored thereon is disclosed. When executed by at least one processor, the non-transitory computer-readable medium causes the at least one processor to perform a method for generating a vehicle HMI. The method may determine the identities of each of a plurality of occupants in a vehicle. In addition, the method may obtain a plurality of interface settings corresponding to the plurality of occupants according to the identities. The method may also perform a machine learning operation according to the identities of the plurality of occupants and the plurality of interface settings. The vehicle HMI may be generated according to a result of the machine learning operation.

BRIEF DESCRIPTION OF THE DRAWINGS

The accompanying drawings, which are incorporated herein and form a part of the specification, illustrate implementations of the present disclosure and, together with the description, further serve to explain the present disclosure and to enable a person skilled in the pertinent art to make and use the present disclosure.

Figure 1:
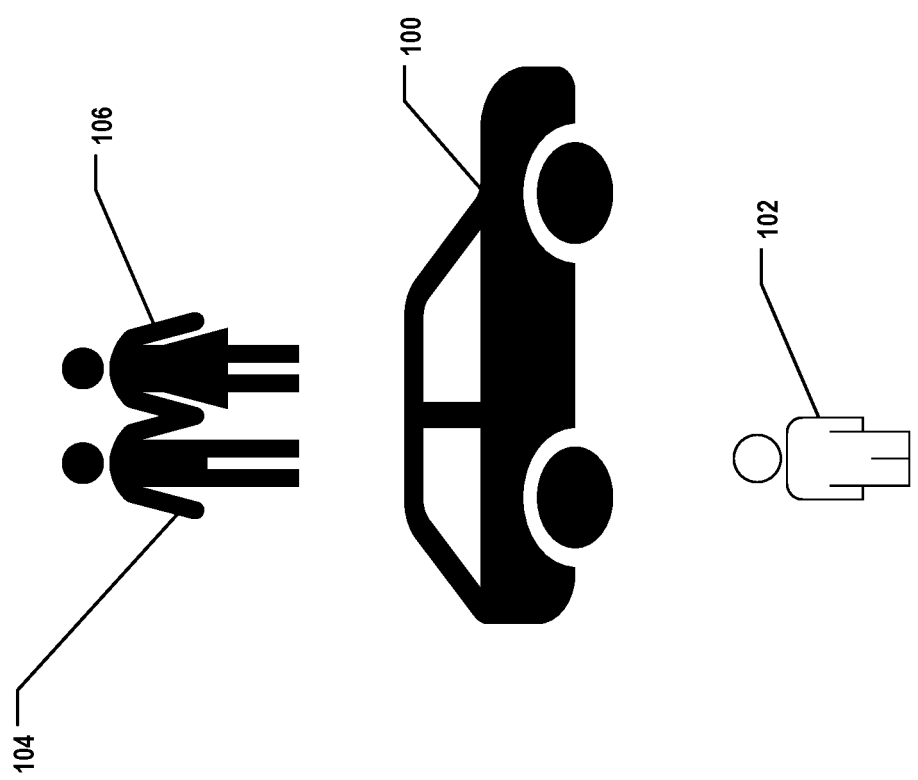
FIG. 1 illustrates a schematic diagram of the interaction between the vehicle and the users according to some embodiments of the present disclosure.

Implementations of the present disclosure will be described with reference to the accompanying drawings.

DETAILED DESCRIPTION

Although specific configurations and arrangements are discussed, it should be understood that this is done for illustrative purposes only. As such, other configurations and arrangements may be used without departing from the scope of the present disclosure. Also, the present disclosure may also be employed in a variety of other applications. Functional and structural features as described in the present disclosures may be combined, adjusted, and modified with one another and in ways not specifically depicted in the drawings, such that these combinations, adjustments, and modifications are within the scope of the present discloses.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

It should be readily understood that the meaning of "on," "above," and "over" in the present disclosure should be interpreted in the broadest manner such that "on" not only means "directly on" something but also includes the meaning of "on" something with an intermediate feature or a layer therebetween, and that "above" or "over" not only means the meaning of "above" or "over" something but may also include the meaning it is "above" or "over" something with no intermediate feature or layer therebetween (i.e., directly on something).

Further, spatially relative terms, such as "beneath," "below," "lower," "above," "upper," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2A:
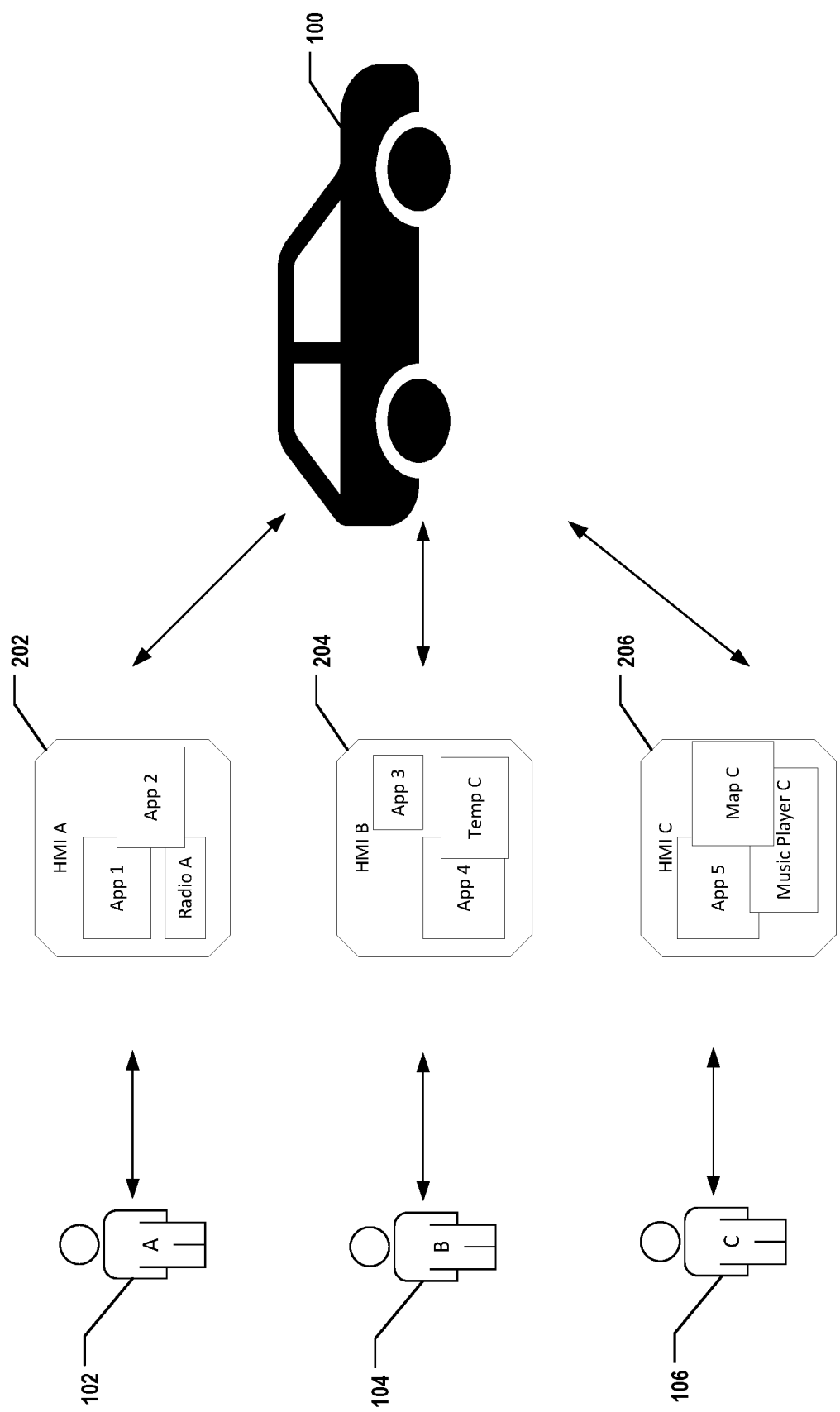
FIGS. 2A-2C illustrate schematic diagrams of an exemplary human machine interface (HMI) between the vehicle and the users according to some embodiments of the present disclosure.
Figure 2B:
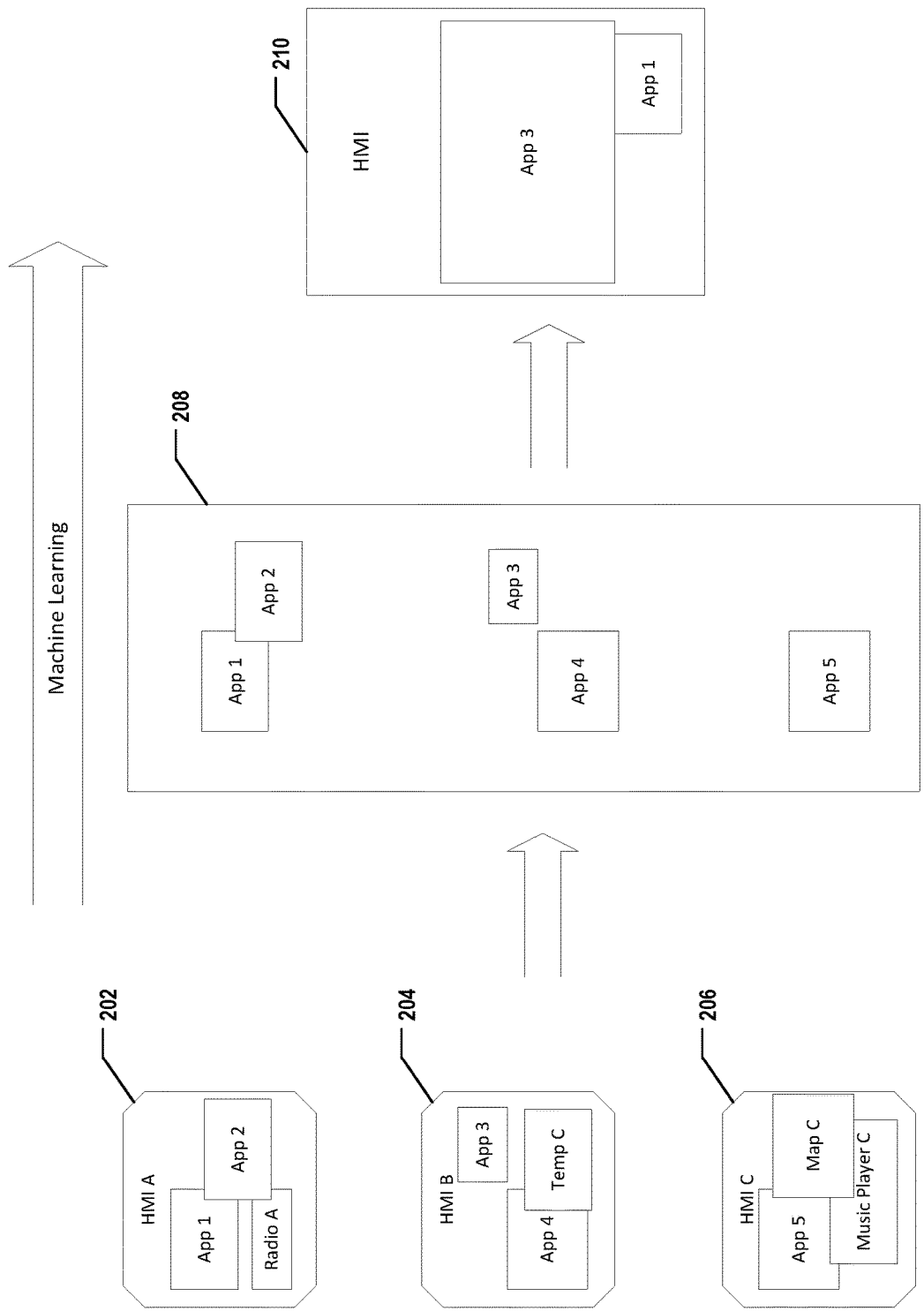
Figure 2C:
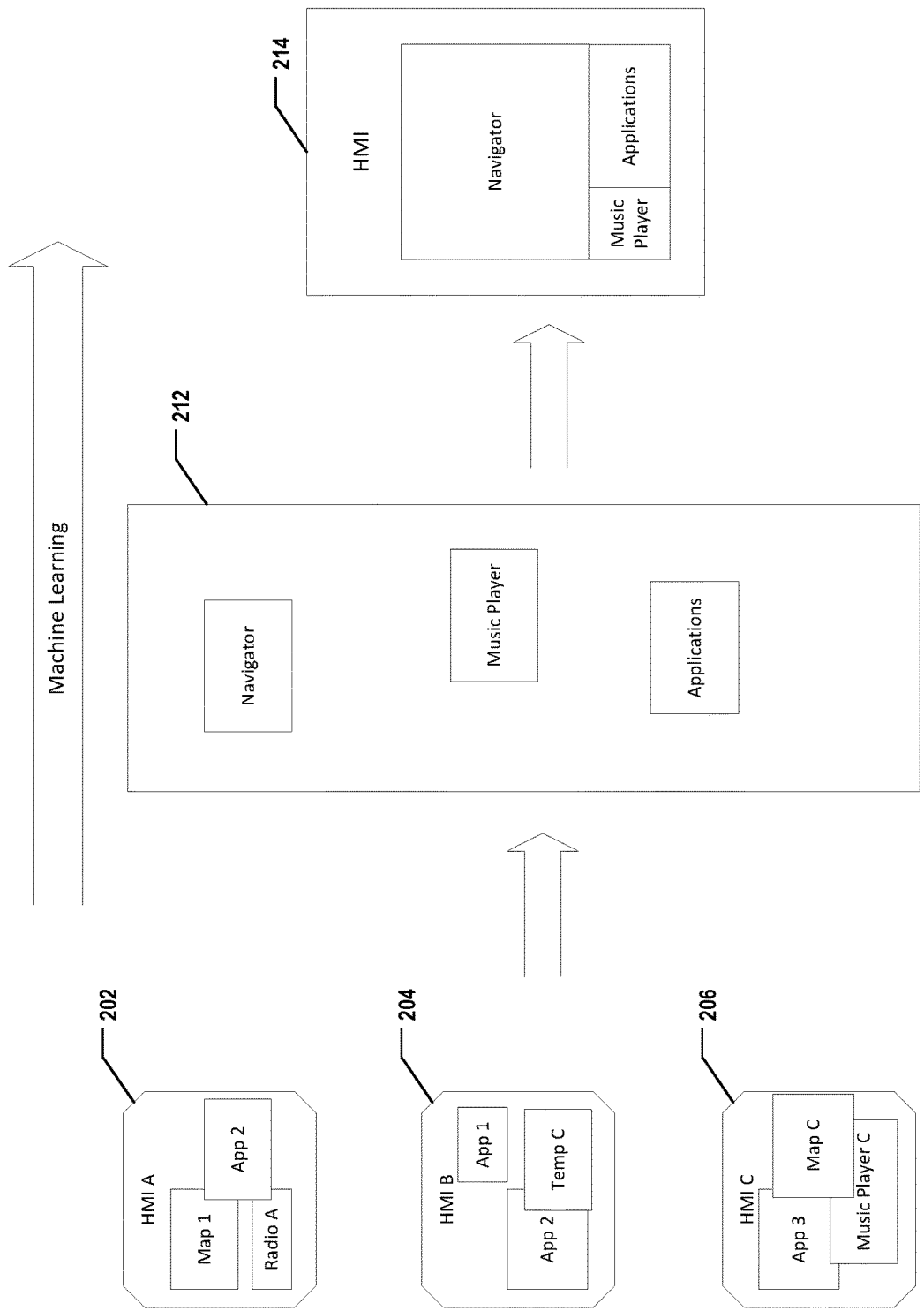

FIG. 1 illustrates a schematic diagram of an interaction between the vehicle 100 and the users 102, 104, and 106 according to some embodiments of the present disclosure while FIGS. 2A-2C illustrate schematic diagrams of exemplary HMIs 202, 204, and 206 between the vehicle 100 and the users 102, 104, and 106 according to some embodiments of the present disclosure.

The human machine interface (HMI) may allow a person to connect to or interact with a machine, system, or device. When a driver, such as the user 102 in FIGS. 1 and 2A, sits in the driver's seat of the vehicle 100, the HMI 202 may be used to communicate with the vehicle 100. In some implementations, the HMI 202 may include buttons and/or the screens on a dashboard, steering wheel, and/or instrument panels. In other implementations, the HMI 202 may include voice control, voice identification, camera, haptic feedback, gesture identification and control, virtual assistant, and other suitable applications. In some implementations, the HMI may apply to infotainment screens, touchpads, navigation buttons, or even simple single-function controls. The HMI may or may not be tangible. Audible and actionable results may also be included in the HMI.

In some implementations, every user may have a personalized or customized HMI. For example, the user 102 may communicate with the vehicle 100 through the HMI 202 which is customized for the user 102. The user 104 may communicate with the vehicle 100 through the HMI 204 which may be customized for the user 104. The user 106 may communicate with the vehicle 100 through the HMI 206 which is customized for the user 106. In some implementations, the HMIs 202, 204, and 206 may be predefined and stored in the physical storage device in the vehicle 100. When the user 102, 104, or 106 enters the vehicle 100, the vehicle 100 may identify the user and provide the customized HMI corresponding to the user. In some implementations, the settings of the HMIs 202, 204, and 206 may be stored in a cloud storage space and downloaded to the vehicle 100 through suitable ways, such as wireless communications, when the vehicle 100 identifies the user.

In some implementations, the HMI 202 corresponding to the user 102 may include vehicle applications, such as an entertainment application, seat adjustment setting, music playlist, temperature setting, and so on. The HMI 204 corresponding to the user 104 or the HMI 206 corresponding to the user 106, may have different content with the HMI 202, or may have partially similar content as the HMI 202 for the user 102, which is described as a non-limiting example. In some implementations, the same user, such as the user 102, may have more than one HMI setting, and the vehicle 100 may identify the position of the user 102, like a driver or passenger, and provide different HMI corresponding to the position of the user 102.

FIG. 2B illustrates a schematic diagram of the machine learning operations meshing the HMIs 202, 204, and 206 to generate a new HMI 210. In some implementations, the HMIs 202, 204, and 206 may be the interface between the users 102, 104, and 106 and the vehicle 100. In some implementations, as shown in FIGS. 2A-2B, the HMI 202 may display a first application (App 1), a second application (App 2), and a radio player (Radio A); the HMI 204 may display a third application (App 3), a fourth application (App 4), and a temperature control screen (Temp C); and the HMI 206 may display a fifth application (App 5), a music player (Music Player C), and a navigator (Map C). When a new user, for example a new passenger, enters the vehicle 100, the machine learning operations may be performed to generate the HMI 210.

During the machine learning operations, the applications, including App 1, App 2, App 3, App4, and App 5, may be collected and shown in a complete interface 208. Next, in some implementations, the user may choose which application would be suitable for the current scenario and then obtain the HMI 210. In some implementations, the applications may be chosen automatically based on the users' historical record. In some implementations, the locations of each application displayed on the interface may be decided by the user. In some implementations, the locations of each application displayed on the interface may be automatically decided during the machine learning operations.

In some implementations, the machine learning operations may learn or identify the amount and/or identities of the users, obtain the information of the available screen space for the interface, and determine the applications fit the users and/or the current scenario, to generate the HMI 210. In some implementations, the synergy between the applications may be determined during the machine learning operations. For example, when some applications are social networking applications, or are media streaming applications, the synergy may be determined during the machine learning operations, and then the commonality of these applications will be considered when generating the HMI 210.

In some implementations, the location and/or the interface size of the selected applications may be further adjusted to fit the screen displaying the HMI 210. For example, as shown in FIG. 2B, the application size of App 3 may be enlarged, and the locations of App 1 and App 3 may be moved to fit the HMI 210. In some implementations, the machine learning operations may determine the best place, size, and/or shape of the applications in the HMI 210.

FIG. 2C illustrates another schematic diagram of the machine learning operations meshing the HMIs 202, 204, and 206 to generate a new HMI 210. In some implementations, the users' preferred settings or preferences of HMIs 202, 204, and 206 may be defined and stored in advance. When users 102, 104, and/or 106 enter the vehicle 100 together or sequentially, the identities and/or positions in the vehicle 100 of users 102, 104, and/or 106 may be determined first, and the determined users' preferred settings or preferences may be used for generating the HMI 214. In some implementations, the machine learning operations may obtain portions that were agreed by the users or have common preferences in HMIs 202, 204, and 206 corresponding to the users 102, 104, and 106, and the agreed or common portions may be given a higher priority during the machine learning operations. For example, as shown in FIG. 2C, the agreed or common portions may include the navigator, the music player, and/or the application, and may be shown in the interface 212. The machine learning operations may further adjust the size and/or the locations of the navigator, the music player, and/or the application to generate the HMI 214 fitting the screen size of the HMI 214. In some implementations, the machine learning operations may determine the best place, size, and/or shape of the navigator, the music player, and/or the application in the HMI 214.

In some implementations, when a separate display is designated to the driver, the machine learning operations may further generate a different HMI for the driver. In some implementations when a separate display is designated to the backseat passengers, the machine learning operations may further generate a different HMI for the backseat passengers.

Figure 3:
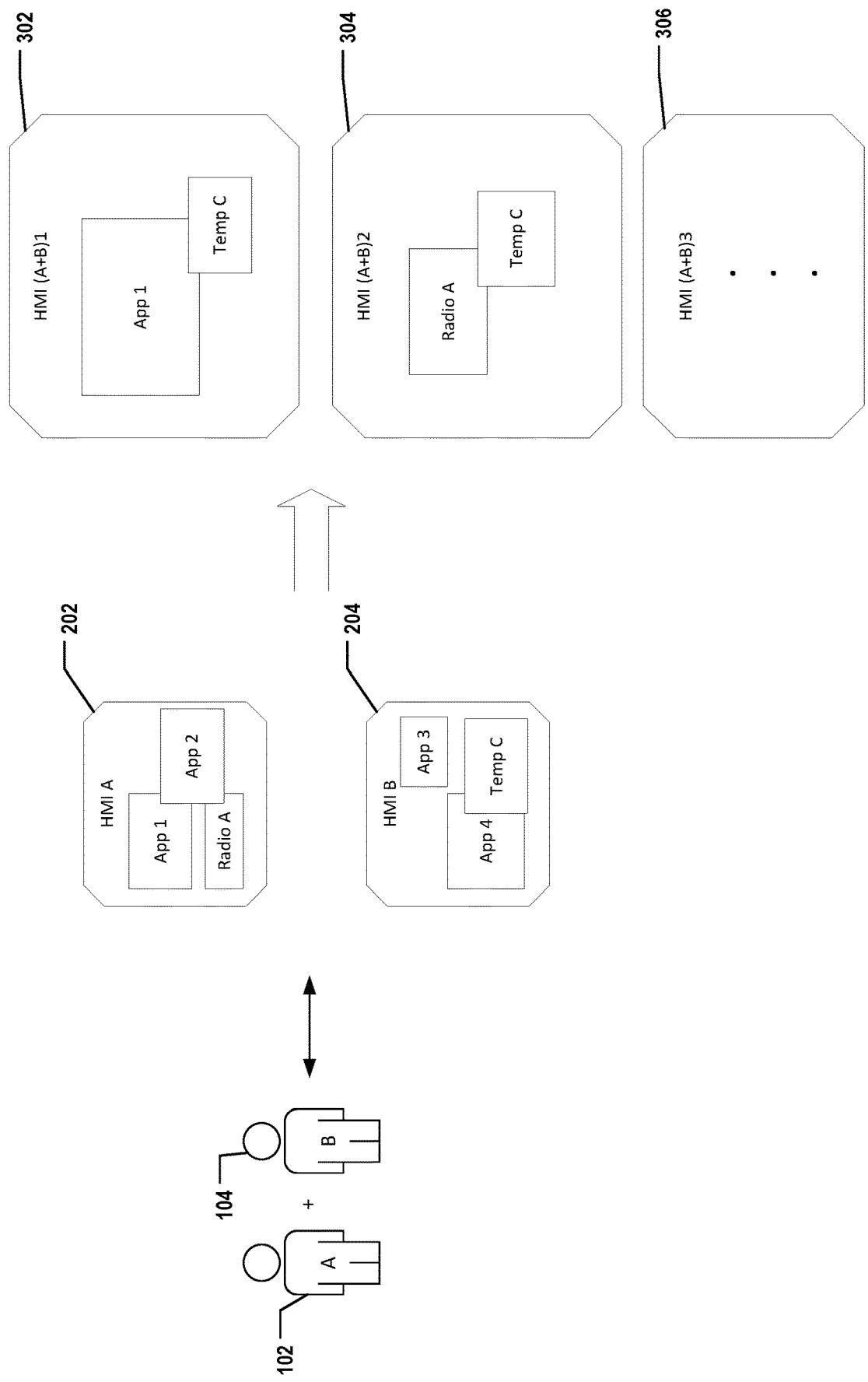
FIG. 3 illustrates a schematic diagram of another exemplary HMI between the vehicle and the users according to some embodiments of the present disclosure.

FIG. 3 illustrates a schematic diagram of another exemplary HMI 302 between the vehicle 100 and the users 102 and 104 according to some embodiments of the present disclosure. In some implementations, multiple occupants, such as the user 102 and the user 104, may be in the same vehicle, and the HMI 302 may be provided based on this scenario. In some implementations, the user 102 may have a favorite or predefined HMI 202 and the user 104 may have a favorite or predefined HMI 204. When the user 102 and the user 104 enter the vehicle 100 together, the user 102 enters the vehicle 100 after the user 104, or the user 104 enters the vehicle 100 after the user 102, the HMI in the vehicle 100 may be changed when detecting the change of the occupants, including the driver and/or the passengers. The new HMI 302 may be provided by merging the HMI 202 and the HMI 204. In some implementations, an HMI generating system may be applied to provide the HMI 302.

In some implementations, the HMI generating system may perform an identification operation first to determine the identities of the occupants in the vehicle 100 and/or the seating of the occupants in the vehicle 100. The HMI generating system may obtain the predefined HMIs 202 and 204 and/or the historical record of HMI used by each identified user 102 and 104, and perform a computing based on the predefined HMIs 202 and 204 and/or the historical record to obtain a new HMI 302. In some implementations, the predefined HMIs 202 and 204 and/or the historical record may be stored in the vehicle 100, such as a non-volatile storage device in the vehicle 100, or be stored in a cloud space. In some implementations, the computation of merging the HMIs 202 and 204 may be performed by the machine learning operations or neural network systems.

In some implementations, the machine learning operations may obtain the predefined HMIs 202 and 204 and/or the historical record, and divide that information into multiple calculation nodes and interlayers to perform the computation. For example, the entertainment application, the seat adjustment setting, the music playlist, or the temperature setting corresponding to the user 102 stored in the HMI 202 or the historical record of the user 102 may be divided into multiple calculation nodes. Similarly, the entertainment application, the seat adjustment setting, the music playlist, or the temperature setting corresponding to the user 104 stored in the HMI 204 or the historical record of the user 104 may be divided into multiple calculation nodes. In some implementations, some weighting factors may be chosen to perform the computation. For example, the seating of the occupants, the role of the occupants, such as a driver or a passenger, or the relationship between the occupants, may be chosen as one of the weighting factors in the computation. In some implementations, the usage history of the HMIs in the historical record may be also chosen as one of the weighting factors in the computation, such as the using frequency or the using time.

In some implementations, the machine learning operations may include the supervised learning algorithms that contain a user's input and the mathematical models to estimate and generate the new HMI 302. In some implementations, the users may provide some predefined training scenarios as the training data of the machine learning operations. In some implementations, the machine learning operations may include the unsupervised learning algorithms that take data from the calculation nodes of the HMI 202 and/or the HMI 204, and find structures in these calculation nodes, like grouping or clustering of data points. For example, in some implementations, one or more convolutional neural network (CNN) may be used to classify the divided calculation node and the interlayers obtained from the HMI 202, the HMI 204, and the historical record, and then one or more artificial neural networks (ANN) may be used to estimate and generate the new HMI 302. As shown in FIG. 3, based on different weighting factors, the same input source, such as the HMIs 202 and 204, may have multiple different outputs, such as the new HMIs 304 and 306, that may be used in the vehicle 100.

Figure 4:
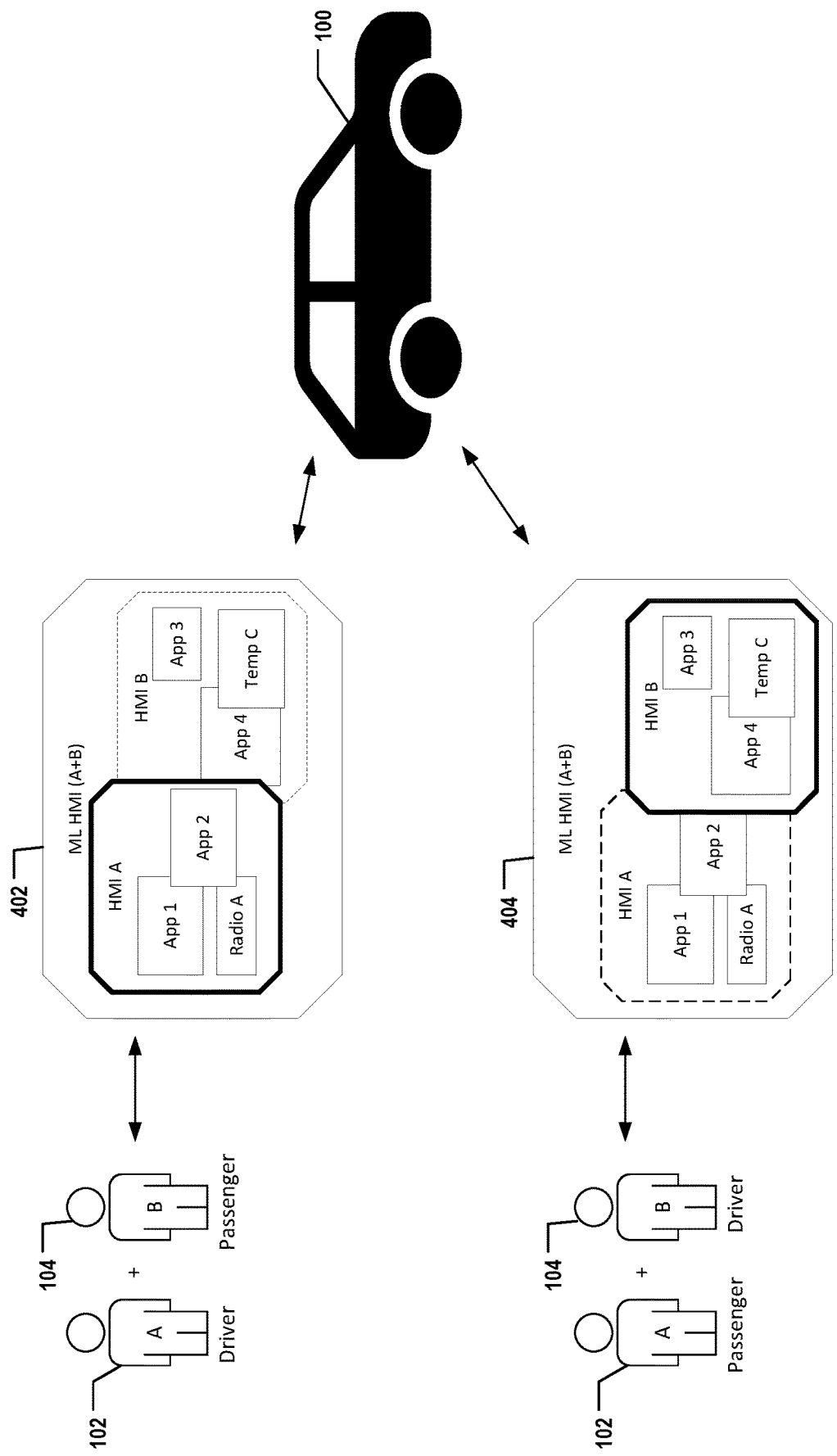
FIG. 4 illustrates a schematic diagram of yet another exemplary HMI between the vehicle and the users according to some embodiments of the present disclosure.

FIG. 4 illustrates a schematic diagram of another exemplary HMI 402 between the vehicle 100 and the users 102 and 104 according to some embodiments of the present disclosure. In some implementations, the machine learning operations may take into account of the roles of the occupants into consideration. For example, in the situation that the user 102 and the user 104 are in the vehicle 100 together, when the user 102 is the driver, the machine learning operations may consider the role of the user 102 and add weight to some applications required for driving. For example, the navigation applications, in the HMI 202 corresponding to the user 102, may be used to generate the HMI 402 when the user 102 is detected as the driver of the vehicle 100. In another example, when the user 102 is the backseat passenger, the machine learning operations may add weight to entertainment applications, such as video games, in the HMI 202 corresponding to the user 102 when generating the HMI 404.

In some implementations, the HMIs 302, 304, 306, 402, or 404 may be a merge or an integration of the HMI 202 and the HMI 204. For example, the HMIs 302, 304, 306, 402, or 404 may show the complete content of both the HMI 202 and the HMI 204, or show a portion of content of the HMI 202 and a portion of content of the HMI 204. In some implementations, the HMIs 302, 304, 306, 402, or 404 may be a new HMI providing an interlock of the HMI 202 and the HMI 204. For example, the machine learning operations may obtain a relationship of the settings, the contents, or the applications between the HMI 202 and the HMI 204 individually corresponding to the user 102 and the user 104, and the HMIs 302, 304, 306, 402, or 404 may function based on the learned relationship.

In some implementations, the identities of the users may be determined by the users' biometric characteristics. For example, the vehicle 100 may be equipped with one or more biometric identification devices, such as a fingerprint scanner, voice recognition device, facial recognition device, iris identification device, heart-rate sensor, and so on. The predefined HMI corresponds to each individual user and may be stored in the vehicle 100. When a user enters the vehicle 100, the vehicle may identify the user, such as identifying the user 102 located on the left rear passenger seat, and then provide the corresponding HMI 202 to the HMI generating system as an information source for machine learning operations.

Figure 5:
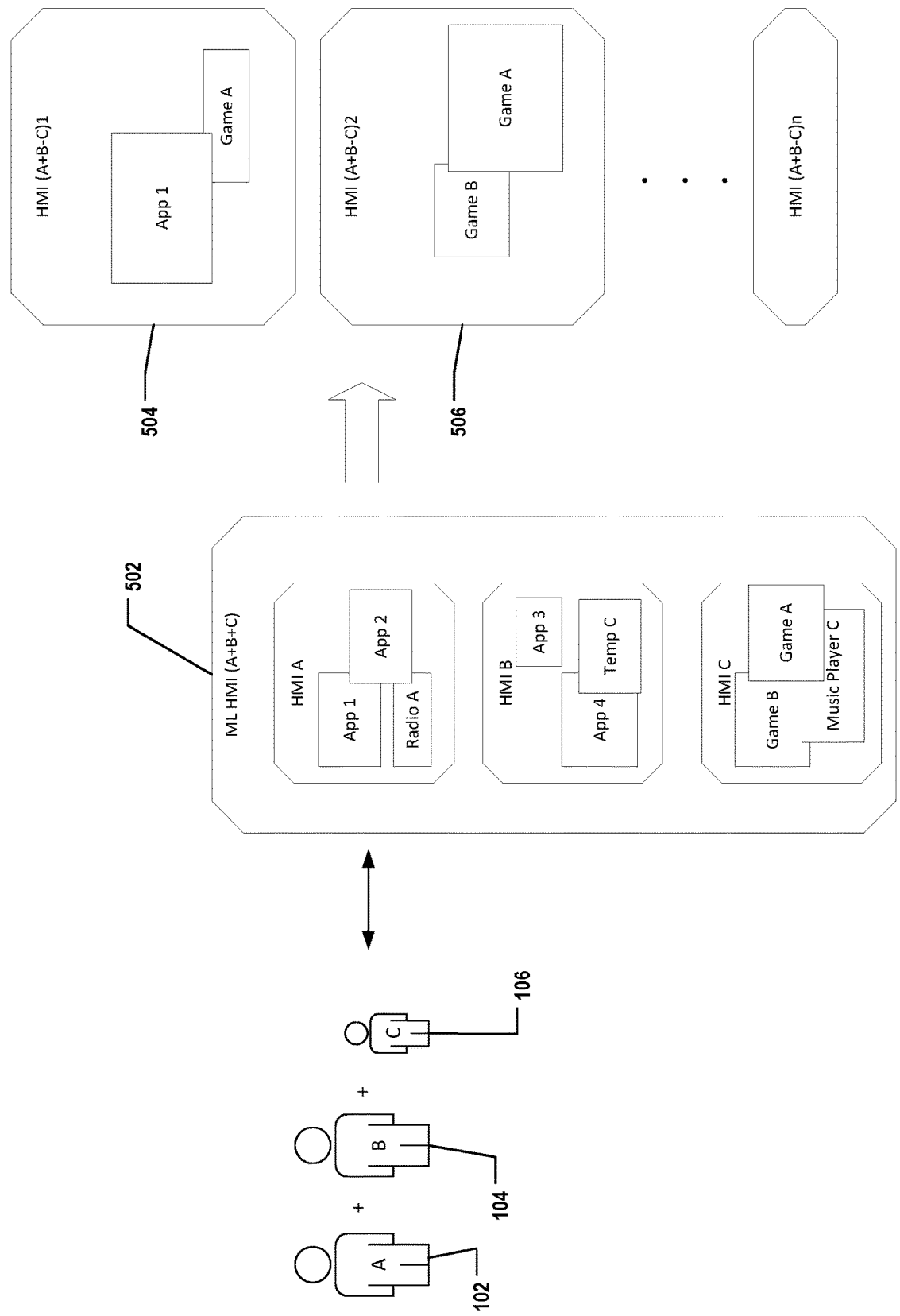
FIG. 5 illustrates a schematic diagram of still another exemplary HMI between the vehicle and the users according to some embodiments of the present disclosure.

FIG. 5 illustrates a schematic diagram of another exemplary HMI 502 between the vehicle 100 and the users 102, 104, and 106 according to some embodiments of the present disclosure. In some implementations, the users in the vehicle 100 may have some predefined relationship, such as a family including parents and child. For example, as shown in FIG. 5, the user 102 and the user 104 may be the parents, and the user 106 may be a child. When the users enter the vehicle 100, the vehicle 100 may first determine the identities of each user, and after obtaining the identities of the users and compare with the predefined relationship, the vehicle may determine the users 102, 104, and 106 are parents and children. In this scenario, the HMI generating system may estimate and generate an HMI 502 suitable for a family group. In an example, other kinds of relationship between multiple users may be also predefined, such as friends, carpooler, or couples, and the HMI generating system may estimate and generate different HMIs 504 or 506 accordingly. In some implementations, the relationship may be a weighting factor in the machine learning operations, and the HMI may be estimated and generated accordingly.

For another example, in some implementations, the group of users 102, 104, and 106 may be in a carpool relationship, and the HMI generating system may estimate the preference of each occupant or some common preferences of all the occupants to generate the HMI 502. For example, the users 102, 104, and 106 may have different music playlists or different favorite podcasts, the HMI generating system may perform the machine learning operations by using the predefined information corresponding to individual users as the learning resource and generate the HMI 502 to provide some common favorite playlists for all occupants in this group.

In some implementations, the vehicle 100 may have multiple output devices, like multiple monitors or multiple speakers. The HMI 504 may be provided to the driver and another HMI 506 may be provided to the passengers that may avoid distracting the driver. For example, the HMI generating system may determine the identities and the seating positions of the driver and the passengers and obtain their predefined preferences to generate one or more than one HMI, and the HMI 504 may be provided to the driver for the navigation or driving safety instructions, and the HMI 506 may be provided to the child for the entertainment programs.

Figure 6:
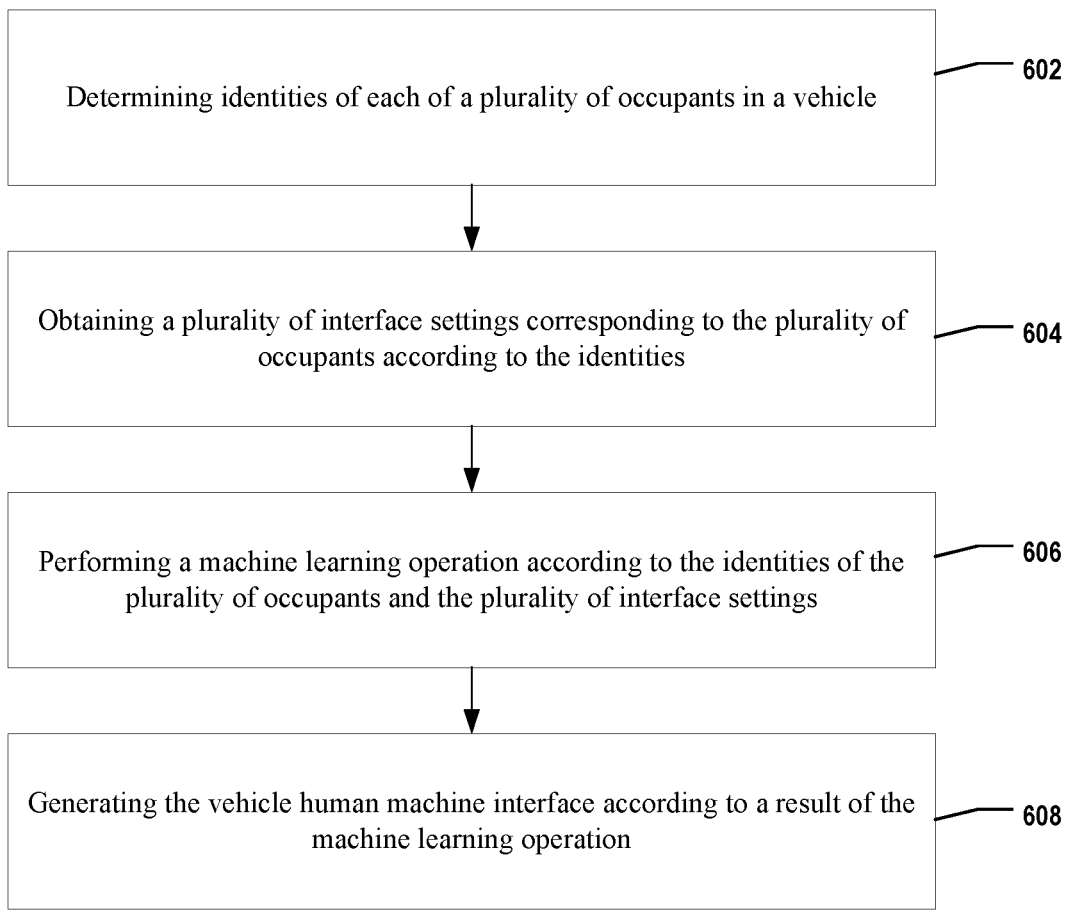
FIG. 6 illustrates a flowchart of an exemplary method for generating the HMI according to some embodiments of the present disclosure.
Figure 7:
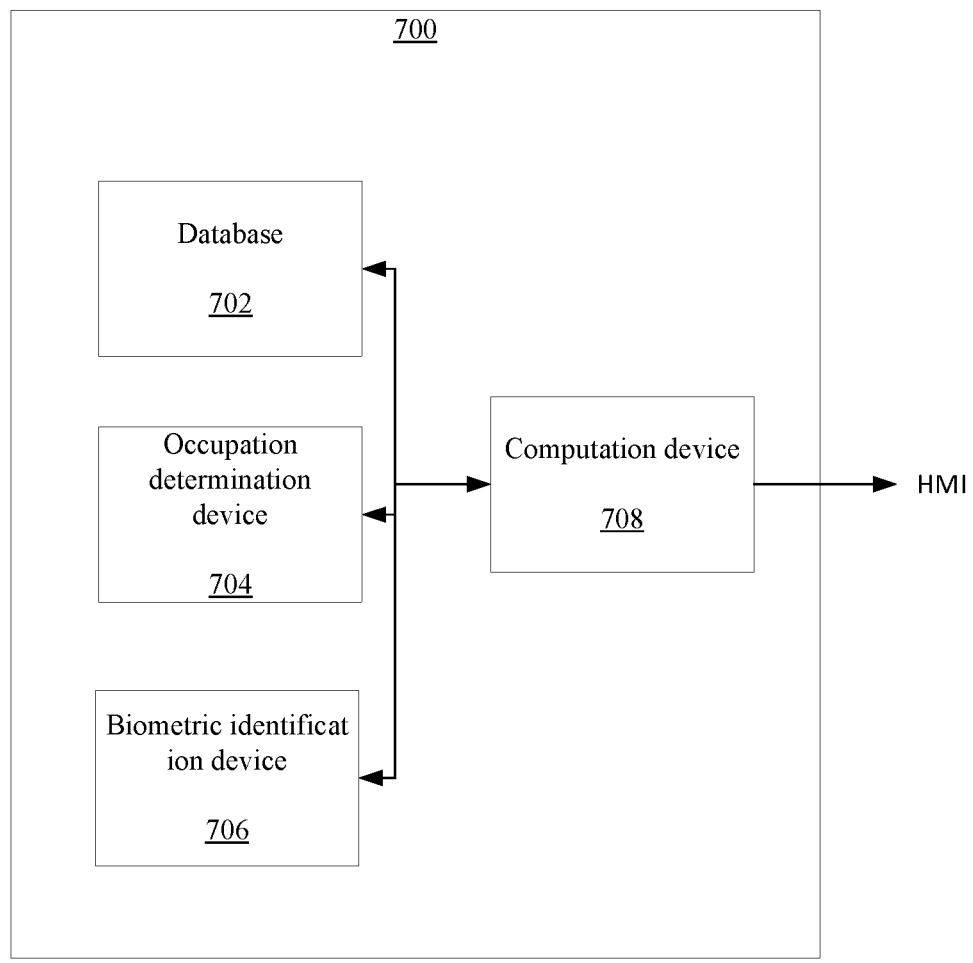
FIG. 7 illustrates an exemplary HMI generating system according to some embodiments of the present disclosure.

FIG. 6 illustrates a flowchart of an exemplary method 600 for generating the HMI according to some embodiments of the present disclosure while FIG. 7 illustrates an exemplary HMI generating system 700 according to some embodiments of the present disclosure. For the purpose of better describing the present disclosure, the method 600 in FIG. 7 and the HMI generating system 700 in FIG. 7 will be discussed together. It is understood that the operations shown in method 600 are not exhaustive and that other operations may be performed as well before, after, or between any of the illustrated operations. Further, some of the operations may be performed simultaneously, or in a different order than shown in FIG. 6 and FIG. 7.

The HMI generating system 700 may include a database 702, an occupation determination device 704, a biometric identification device 706, and a computation device 708. The database 702 may store a plurality of interface settings corresponding to a plurality of occupants. The occupation determination device 704 may be used to determine an occupation status in a vehicle. The biometric identification device 706 may be used to determine an identity information corresponding to more than one occupant in the vehicle based on the occupation status. The computation device 708 may perform a machine learning operation to generate a vehicle HMI based on the plurality of interface settings corresponding to the more than one occupant and the occupation status corresponding to the more than one occupant.

As shown in the operation 602 of FIG. 6, the identities of each of a plurality of occupants in a vehicle are determined. For example, the biometric identification device 706 may be used to determine the occupants in the vehicle 100. In some implementations, the biometric identification device 706 may be used to determine the users' biometric characteristics. For example, the vehicle 100 may be equipped the biometric identification device 706, and the biometric identification device 706 may include the fingerprint scanner, the voice recognition device, the facial recognition device, the iris identification device, the heart-rate sensor, and so on. When a new user, such as a driver or a passenger, enters the vehicle 100, the biometric identification device 706 may identify the user's identity and perform the following operations according to the user's identity.

As shown in the operation 604 of FIG. 6, a plurality of interface settings corresponding to the plurality of occupants are obtained according to the identities. In some implementations, the interface settings corresponding to the plurality of occupants may be predefined and stored in the database 702. The interface settings may include multiple HMIs corresponding to each user (occupant in the vehicle 100). The interface settings may further include the historical record of the usage history corresponding to each user. After the identities of each occupant in the vehicle 100 are determined, the interface settings corresponding to the identified occupants, including the predefined HMIs and the historical record, may be loaded to the HMI generating system 700 for the following operations. In some implementations, the occupation determination device 704 may include an occupant position sensor for determining a seating information of each of the more than one occupant in the vehicle. The seating information indicated a position of each of the more than one occupant in the vehicle.

As shown in the operation 606 of FIG. 6, a machine learning operation is performed according to the identities of the plurality of occupants and the plurality of interface settings. In some implementations, the computation device 708 is used to perform the machine learning operation. In some implementations, the computation device 708 may include a processor. The processor may be used to perform the machine learning operation according to the seating information, the identities, and the interface settings corresponding to the identified occupants in the vehicle 100. As shown in the operation 608 of FIG. 6, the vehicle HMI is generated according to a result of the machine learning operation.

According to one aspect of the present disclosure, a method for generating a vehicle HMI is disclosed. The identities of each of a plurality of occupants in a vehicle are determined. A plurality of interface settings corresponding to the plurality of occupants are obtained according to the identities. A machine learning operation is performed according to the identities of the plurality of occupants and the plurality of interface settings. The vehicle HMI is generated according to a result of the machine learning operation.

In some implementations, when a new occupant enters the vehicle, an identity of the new occupant is determined. In some implementations, a biometric identification device is provided in the vehicle, and the identities of the plurality of occupants are determined through the biometric identification device.

In some implementations, a seating information of the plurality of occupants is determined, and a weighting operation is performed based on the seating information when performing the machine learning operation.

In some implementations, the plurality of interface settings are compared with a historical record of the interface setting corresponding to each occupant, and the machine learning operation is performed according to the historical record, the identities of the plurality of occupants, and the plurality of interface settings.

In some implementations, the plurality of interface settings are merged by choosing a portion of the interface setting from a complete interface setting corresponding to each occupant, and the vehicle HMI is generated according to the portion of the interface setting corresponding to each occupant. In some implementations, the plurality of interface settings correspond to the plurality of occupants are interlocked. In some implementations, the vehicle HMI is generated according to a predefined relationship of the plurality of occupants.

In some implementations, a common portion in the plurality of interface settings corresponding to the plurality of occupants is determined, and the vehicle HMI is generated according to the common portion.

In some implementations, a preference in the plurality of interface settings corresponding to the plurality of occupants is extracted, and the preference is merged according to the identities of the plurality of occupants to generate the vehicle HMI.

In some implementations, an identity information of each of the plurality of occupants is collected, and the historical record of the interface setting corresponding to the identity information of each of the plurality of occupants is stored.

In some implementations, the historical record, the identities of the plurality of occupants, the seating information, and the plurality of interface settings corresponding to the plurality of occupants are divided into a plurality of calculation nodes, a connection between the plurality of calculation nodes is estimated, and the vehicle HMI is generated according to the connection and the plurality of calculation nodes.

According to another aspect of the present disclosure, a vehicle HMI generating system is disclosed. The system includes a database, an occupation determination device, a biometric identification device, and a computation device. The database is stored a plurality of interface settings corresponding to a plurality of occupants. The occupation determination device is used to determine an occupation status in a vehicle. The biometric identification device is used to determine an identity information corresponding to more than one occupants in the vehicle based on the occupation status. The computation device performs a machine learning operation to generate a vehicle HMI based on the plurality of interface settings corresponding to the more than one occupants and the occupation status corresponding to the more than one occupants.

In some implementations, the biometric identification device includes at least one of a fingerprint scanner, a voice recognition device, a facial recognition device, an iris identification device, and a heart-rate sensor.

In some implementations, the plurality of interface settings include a plurality of predefined HMIs corresponding to each of the plurality of occupants and a plurality of historical records corresponding to each of the plurality of occupants.

In some implementations, the occupation determination device includes an occupant position sensor determining a seating information of each of the more than one occupant in the vehicle. The seating information indicates a position of each of the more than one occupant in the vehicle.

In some implementations, the computation device includes a processor configured to perform a method for generating the vehicle HMI. The method includes performing the machine learning operation according to the seating information of each of the more than one occupant in the vehicle, the plurality of predefined HMIs corresponding to each of the more than one occupants in the vehicle, and the plurality of historical records corresponding to each of the more than one occupants in the vehicle.

In some implementations, the processor divides the plurality of historical records, the plurality of predefined HMIs, and the seating information corresponding to each of the more than one occupant into a plurality of calculation nodes, estimates a connection between the plurality of calculation nodes, and generates the vehicle HMI based on to the connection and the plurality of calculation nodes.

In some implementations, the processor merges the plurality of predefined HMIs by choosing a portion of the plurality of interface settings corresponding to the more than one occupant in the vehicle, and generates the vehicle HMI according to the chosen portion of the plurality of interface settings.

In some implementations, the processor interlocks the plurality of predefined HMIs by determining a connection between the plurality of interface settings corresponding to the more than one occupant in the vehicle, and generates the vehicle HMI according to the connection between the plurality of interface settings.

In some implementations, the processor determines a relationship between the more than one occupant in the vehicle, and generates the vehicle HMI according to relationship between the more than one occupants.

According to still another aspect of the present disclosure, a non-transitory computer-readable medium having instructions stored thereon is disclosed. When executed by at least one processor, the non-transitory computer-readable medium causes the at least one processor to perform a method for generating a vehicle HMI. The identities of each of a plurality of occupants in a vehicle are determined. A plurality of interface settings corresponding to the plurality of occupants are obtained according to the identities. A machine learning operation is performed according to the identities of the plurality of occupants and the plurality of interface settings. The vehicle HMI is generated according to a result of the machine learning operation.

The foregoing description of the specific implementations may be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

What is claimed is:

1. A method for generating a vehicle human machine interface, comprising:
   determining identities of each of a plurality of occupants in a vehicle;
   obtaining a plurality of interface settings comprising a plurality of predefined human machine interfaces respectively corresponding to the plurality of occupants in the vehicle according to the identities, wherein each of the plurality of predefined human machine interfaces respectively corresponding to each of the plurality of occupants comprises a plurality of applications; and
   meshing the plurality of interface settings for display on the vehicle human machine interface by merging a portion of the plurality of predetermined human machine interfaces corresponding to the plurality of occupants into a merged human machine interface having different applications selected from among the plurality of applications of each of the plurality of predefined human machine interfaces,
wherein each of the plurality of occupants is able to operate all the different applications through the merged vehicle human machine interface.

2. The method of claim 1, wherein determining identities of each of the plurality of occupants in the vehicle comprises determining an identity of a new occupant when the new occupant enters the vehicle.

3. The method of claim 1, further comprising:
providing a biometric identification device in the vehicle; and
determining identities of the plurality of occupants through the biometric identification device.

4. The method of claim 1, further comprising:
determining a seating information of the plurality of occupants; and
performing a weighting operation based on the seating information when meshing the plurality of interface settings.

5. The method of claim 4, wherein meshing the plurality of interface settings, comprises:
comparing the plurality of interface settings with a historical record of the interface setting corresponding to each occupant; and
meshing the plurality of interface settings according to the historical record, the identities of the plurality of occupants, and the plurality of interface settings.

6. The method of claim 5, wherein meshing the plurality of interface settings for display on the vehicle human machine interface, comprises at least one of:
merging the plurality of interface settings by choosing a portion of the interface setting from a complete interface setting corresponding to each occupant, and generating the vehicle human machine interface according to the portion of the interface setting corresponding to each occupant;
interlocking the plurality of interface settings correspond to the plurality of occupants; and
generating the vehicle human machine interface according to a predefined relationship of the plurality of occupants.

7. The method of claim 6, wherein interlocking the plurality of interface settings correspond to the plurality of occupants, comprises:
determining a common portion in the plurality of interface settings corresponding to the plurality of occupants; and
generating the vehicle human machine interface according to the common portion.

8. The method of claim 5, wherein meshing the plurality of interface settings according to the identities of the plurality of occupants and the plurality of interface settings, comprises:
extracting a preference in the plurality of interface settings corresponding to the plurality of occupants; and
merging the preference according to the identities of the plurality of occupants to generate the vehicle human machine interface.

9. The method of claim 5, further comprising:
collecting an identity information of each of the plurality of occupants; and
storing the historical record of the interface setting corresponding to the identity information of each of the plurality of occupants.

10. The method of claim 5, wherein meshing the plurality of interface settings comprises:
dividing the historical record, the identities of the plurality of occupants, the seating information, and the plurality of interface settings corresponding to the plurality of occupants into a plurality of calculation nodes; estimating a connection between the plurality of calculation nodes; and
generating the vehicle human machine interface according to the connection and the plurality of calculation nodes.

11. The method of claim 1,
wherein the plurality of predefined human machine interfaces comprise a first human machine interface corresponding to a first occupant among the plurality of occupants and a second human machine interface corresponding to a second occupant among the plurality of occupants,
wherein a first portion of applications in the first human machine interface and a second portion of applications in the second human machine interface are selected to be included in the merged human machine interface, and
wherein the first portion of applications and the second portion of applications are the same.

12. A vehicle human machine interface generating system, comprising:
a database storing a plurality of interface settings comprising a plurality of predefined human machine interfaces respectively corresponding to a plurality of occupants, wherein each of the plurality of predefined human machine interfaces respectively corresponding to each of the plurality of occupants comprises a plurality of applications;
an occupation determination device determining an occupation status in a vehicle;
a biometric identification device determining an identity information corresponding to more than one occupant in the vehicle based on the occupation status;
a computation device performing a machine learning operation to generate a vehicle human machine interface by merging a portion of the plurality of predetermined human machine interfaces corresponding to the plurality of occupants into a merged human machine interface having different applications selected from among the plurality of applications of each of the plurality of predefined human machine interfaces based on the occupation status corresponding to the more than one occupant,
wherein each of the plurality of occupants is able to operate all the different applications through the merged vehicle human machine interface.

13. The vehicle human machine interface generating system of claim 12, wherein the biometric identification device comprises at least one of a fingerprint scanner, a voice recognition device, a facial recognition device, an iris identification device, and a heart-rate sensor.

14. The vehicle human machine interface generating system of claim 12, wherein the plurality of interface settings further comprise a plurality of historical records corresponding to each of the plurality of occupants.

15. The vehicle human machine interface generating system of claim 12, wherein the occupation determination device comprises an occupant position sensor determining a seating information of each of the more than one occupant in the vehicle, wherein the seating information indicates a position of each of the more than one occupant in the vehicle.

16. The vehicle human machine interface generating system of claim 15, wherein the computation device comprises:
a processor configured to perform a method for generating the vehicle human machine interface, comprising:
performing the machine learning operation according to the seating information of each of the more than one occupant in the vehicle, the plurality of predefined human machine interfaces corresponding to each of the more than one occupants in the vehicle, and the plurality of historical records corresponding to each of the more than one occupants in the vehicle.

17. The vehicle human machine interface generating system of claim 16, wherein the processor divides the plurality of historical records, the plurality of predefined human machine interfaces, and the seating information corresponding to each of the more than one occupant into a plurality of calculation nodes, estimates a connection between the plurality of calculation nodes, and generates the vehicle human machine interface based on to the connection and the plurality of calculation nodes.

18. The vehicle human machine interface generating system of claim 16, wherein the processor chooses a common portion of each of the plurality of interface settings corresponding to the more than one occupant in the vehicle, and generates the vehicle human machine interface according to the chosen common portion of the plurality of interface settings.

19. The vehicle human machine interface generating system of claim 16, wherein the processor interlocks the plurality of predefined human machine interfaces by determining a connection between the plurality of interface settings corresponding to the more than one occupant in the vehicle, and generates the vehicle human machine interface according to the connection between the plurality of interface settings.

20. The vehicle human machine interface generating system of claim 16, wherein the processor determines a relationship between the more than one occupant in the vehicle, and generates the vehicle human machine interface according to relationship between the more than one occupants.

21. A non-transitory computer-readable medium having instructions stored thereon that, when executed by at least one processor, causes the at least one processor to perform a method for generating a vehicle human machine interface, comprising:
determining identities of each of a plurality of occupants in a vehicle;
obtaining a plurality of interface settings comprising a plurality of predefined human machine interfaces respectively corresponding to the plurality of occupants in the vehicle according to the identities, wherein each of the plurality of predefined human machine interfaces respectively corresponding to each of the plurality of occupants comprises a plurality of applications; and
meshing the plurality of interface settings for display on the vehicle human machine interface by merging a portion of the plurality of predefined human machine interfaces corresponding to the plurality of occupants into a merged human machine interface having different applications selected from among the plurality of applications of each of the plurality of predefined human machine interfaces,
wherein each of the plurality of occupants is able to operate all the different applications through the merged vehicle human machine interface.

* * * * *